(12) United States Patent
Menheere

(10) Patent No.: US 9,360,141 B2
(45) Date of Patent: Jun. 7, 2016

(54) BALL JOINT PIPE CONNECTION

(71) Applicant: Marco Daniel Menheere, Bussum (NL)

(72) Inventor: Marco Daniel Menheere, Bussum (NL)

(73) Assignee: LEO DYNAMISCHE INVESTERING B.V., Amsterdam (NL)

( * ) Notice: Subject to any disclaimer, the term of this patent is extended or adjusted under 35 U.S.C. 154(b) by 0 days.

(21) Appl. No.: 14/368,834

(22) PCT Filed: Dec. 18, 2012

(86) PCT No.: PCT/NL2012/050902
§ 371 (c)(1),
(2) Date: Jun. 26, 2014

(87) PCT Pub. No.: WO2013/100765
PCT Pub. Date: Jul. 4, 2013

(65) Prior Publication Data
US 2015/0014988 A1    Jan. 15, 2015

(30) Foreign Application Priority Data
Dec. 28, 2011 (EP) .................................. 11195891

(51) Int. Cl.
*F16L 27/04*    (2006.01)
*F16L 27/053*   (2006.01)
*F16L 27/06*    (2006.01)

(52) U.S. Cl.
CPC ............... *F16L 27/04* (2013.01); *F16L 27/053* (2013.01); *F16L 27/06* (2013.01)

(58) Field of Classification Search
CPC .......... F16L 27/053; F16L 27/06; F16L 27/04
USPC .................................................. 285/261, 263
See application file for complete search history.

(56) References Cited

U.S. PATENT DOCUMENTS

| | | | | |
|---|---|---|---|---|
| 1,057,939 A | * | 4/1913 | Cooper | 285/261 |
| 1,946,110 A | * | 2/1934 | Plummer | 285/261 |
| 1,957,761 A | * | 5/1934 | Cushing | 285/261 |
| 1,957,805 A | * | 5/1934 | Rich | 285/261 |

(Continued)

FOREIGN PATENT DOCUMENTS

| | | |
|---|---|---|
| DE | 976 049 | 1/1963 |
| EP | 0078549 | * 5/1983 |

OTHER PUBLICATIONS

International Search Report dated Feb. 22, 2013, corresponding to PCT/NL2012/050902.

*Primary Examiner* — David E Bochna
(74) *Attorney, Agent, or Firm* — Young & Thompson

(57) ABSTRACT

A pipe connection includes a ball joint having shell parts and pipe connection elements at the ends of the shell parts which face away from each other are to be connected to a respective pipe section. The shell parts surround one another in a contacting manner and define a respective longitudinal center line; they are rotatable relative to one another between an aligned position, in which the longitudinal center lines coincide, and a rotated position, in which the longitudinal center lines form an angle which differs from zero. The shell parts together enclose an axial passage which extends between the ends of the shell parts. A sealing element is provided between the outermost and innermost shell part. A lining extends between the outermost shell part and the corresponding pipe connection element. The inner lining surface has a curvature corresponding to that of the outer surface of the innermost shell part.

19 Claims, 1 Drawing Sheet

(56) References Cited

U.S. PATENT DOCUMENTS

| | | |
|---|---|---|
| 2,456,744 A * | 12/1948 | Sjoberg ............... 285/261 |
| 3,048,977 A | 8/1962 | Geary |
| 3,056,615 A * | 10/1962 | Breitenstein ............. 285/263 |
| 3,275,243 A | 9/1966 | Gaubatz |
| 3,429,588 A * | 2/1969 | Nelson ................ 285/261 |
| 3,746,372 A | 7/1973 | Jansen et al. |
| 3,993,525 A | 11/1976 | van der Jagt |
| 3,995,889 A * | 12/1976 | Carr et al. ............. 285/261 |
| 8,740,258 B2 * | 6/2014 | Wells ................. 285/261 |

* cited by examiner

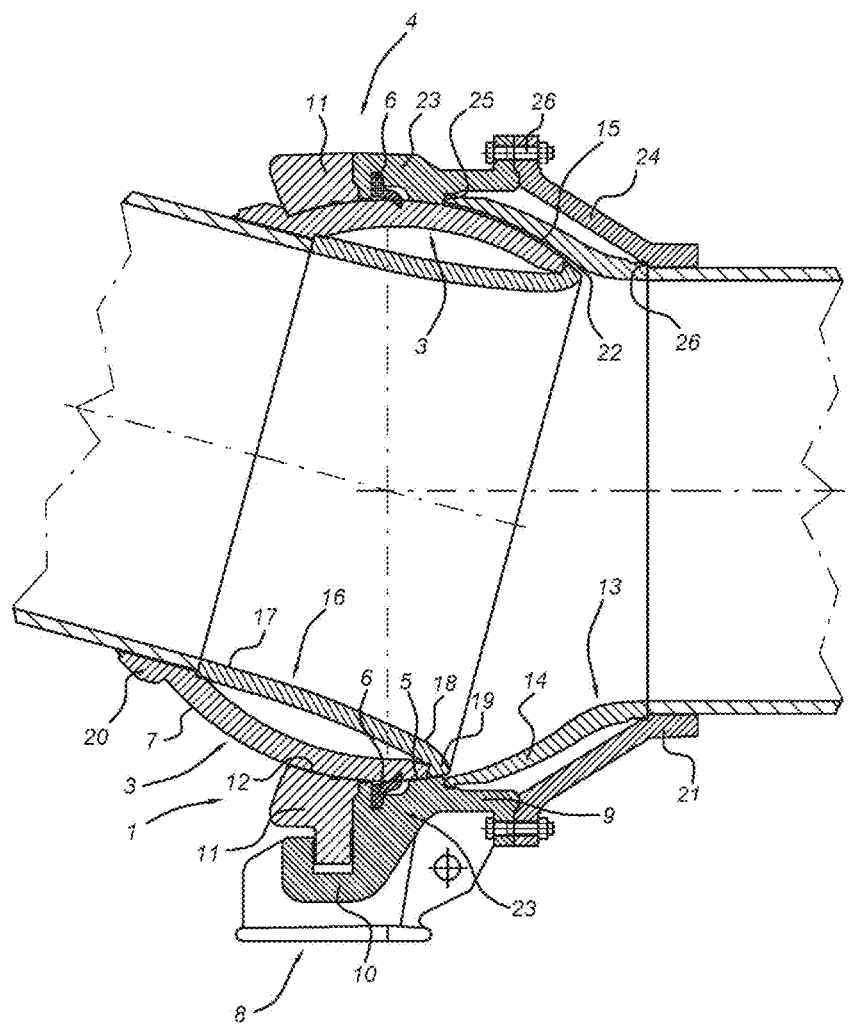

BALL JOINT PIPE CONNECTION

BACKGROUND OF THE INVENTION

The invention is related to a pipe connection, comprising a ball joint having shell parts, pipe connection means at the ends of the shell parts which face away from each other and which are to be connected to a respective pipe section, which shell parts surround one another in a contacting manner, each define a respective longitudinal center line and are rotatable in relation to one another between an aligned position, in which the longitudinal center lines coincide, and a rotated position, in which the longitudinal center lines form an angle with one another which differs from zero, wherein the shell parts together enclose an axial passage which extends between the ends of the shell parts, a sealing element between the outermost shell part and the innermost shell part, and a lining which extends between the outermost shell part and the corresponding pipe connection means.

DESCRIPTION OF THE RELATED ART

Such a pipe connection is known. The lining thereof extends between the outer shell part and a welding sleeve in a frustoconical manner. The purpose of the lining is to protect the inner surface of the case which extends between the outer shell part and the welding sleeve against the abrasive action of the materials which flow through the pipeline. In particular dredging spoils which may contain highly abrasive particles have a detrimental effect on the steel material of the ball joint. Thus, the lining should form a barrier in such a way that the steel material is shielded from the abrasive action of the transported materials.

Although the prior art pipe connection does provide such protection, nevertheless still problems may occur. As a result of the frustoconical shape of the lining, the outer surface of the innermost shell part may still be subjected to the abrasive action mentioned before, in particular in case the ball joint is in a rotated position. In such cases, a fairly wide gap occurs which gives rise to vortices in the flowing materials. These vortex flows have an enhanced abrasive effect, as a result of which the unprotected portion of the innermost shell part is still attacked.

SUMMARY OF THE INVENTION

The object of the invention is to provide a pipe connection of the type described before which is better protected against the abrasion caused by the transported materials. Said object is achieved in that the inner lining surface of the lining has a curvature corresponding to the curvature of the outer surface of the innermost shell part and in that said inner lining surface and said outer surface lie entirely free in relation to one another.

In the pipe connection according to the invention, the lining closely follows the path of the innermost shell part while this is being rotated upon adjusting the ball joint. Thus, only a small gap, preferably with an essentially uniform thickness, is present between the outer surface of the innermost shell part and the lining. Thus, although liquid etc may fill said gap, no vortices will occur as a result of the very limited gap space. Thus, the outer surface of the innermost shell part will no longer be subjected to the abrasive influence of the transported materials. The lining surface may be essentially spherical.

In order to further improve the flow characteristics of the pipe connection, a flow guide may be provided in the innermost shell part. Such flow guide protects the inner surface of the innermost shell part. Preferably, the flow guide may have a cylindrically and/or spherically curved inner flow guide surface. Best results are obtained in case the flow guide extends beyond the end of the inner shell part which adjoins the lining. Thus, the flow guide may have a nose end which lies free in relation to the lining surface. The nose end and the lining surface may enclose a gap, the size of which is essentially identical to the gap between the lining surface and the outer surface of the inner shell part. Thereby, the innermost shell part is fully protected against the flowing materials.

In order to streamline the flow in a proper manner, the flow guide may comprise a flow guide part which is located close to the pipe connection means of the innermost shell part which is essentially cylindrical. Additionally, the flow guide may comprises a further, adjacent flow guide part which is located close to the outermost shell part and which is designed as widening in the form of a cone or trumpet. The latter embodiment has a free cross sectional flow area which remains essentially unobstructed even in the most extreme rotated positions of the shell parts with respect to each other. This represents a further advantage in comparison to the prior art pipe connection, the latter one exhibiting an increasing reduction of the free cross sectional flow area when rotating the shell parts with respect to each other.

Depending on the materials to be transported, the flow guide comprises a specific wear resistant material, such as hardened steel or white-cast iron. Also, the lining comprises such wear resistant material. These materials are selected on the basis of the resistance against the abrasive and possibly chemical properties of the transported materials.

In a known manner, the outermost shell part may comprise shell part halves which enclose the innermost shell part. Preferably, each outer shell part half contacts the innermost shell part in a direct fashion. In addition to this direct contact, one or both outer shell part half may contact the innermost shell part through the sealing element. In particular, a yoke or yoke ring may be attached to the one of the shell part halves of outermost shell part, a gland ring being provided which constitutes the other shell part half of the outermost shell part and which cooperates with said yoke.

Onto the pipe connection, pipe sections may be mounted for instance by means of welding sleeves. Alternatively, mounting flanges may be used.

In a preferred embodiment, a case is provided which extends between the outer shell part and the corresponding pipe connection means, said case being releasably connected to the outer shell part, and the lining being enclosed between facing abutments on the outer shell part and the case. The lining may thus be introduced in the case, and subsequently be mounted onto the outer shell part.

BRIEF DESCRIPTION OF THE DRAWING FIGURE

FIG. 1 illustrates the invention.

DETAILED DISCLOSURE OF THE INVENTION

The invention will now be described further with reference to the FIGURE.

The pipe connection shown in FIGURE consists of the ball joint 1 and two pipe sections welded at opposite ends thereof. The ball joint 1 comprises the innermost shell part 3 and the outermost shell part 4 which are slidingly in contact with each other so as to enable rotational movements of the center lines of the pipe sections. To that end, the shell parts 3, 4 are spherical. In particular, the inner surface 5, 12 of the outermost shell part 4 and the outer surface 7 of the innermost shell part 3 contact each other and are spherical. A sealing element 6 is connected to the outermost shell part 4 and sealingly engages the outer surface 7 of the innermost shell part 3.

The outermost shell part 4 consists of the shell part halves 11, 23. Shell part half 23 forms part of the ring-shaped yoke 8. Said yoke 8 consists of the annular body 9 and a number of jaws 10 distributed over the circumference of said body 9. The other shell part half 11 or ring gland is held in place by means of the jaws 10 of the yoke 8. Between these outer shell part halves 11, 23, the inner shell part 3 is held captive, in such a way that it can rotate as described before.

A lining 13 is provided, which abuts the stop face 25 of the shell part half 23. Furthermore, a case 24 is connected to the shell part of 23 by means of the bolts 26. The case 24 has a stop face 26 as well, in such a way that the lining 13 is held captive between the stop faces 25 and 26. The lining has an inner hollow surface 14, the shape of which corresponds to the spherical shape of the outer surface 7 of the innermost shell part 3. A narrow gap 15 is formed between these surfaces 7, 14, which gap has an essentially uniform thickness, also in the different rotated positions of the shell parts 3, 4 with respect to each other. As a result of the immediate proximity of the lining 13 with respect to the outer surface 7 of the innermost shell part 3, hardly any turbulence or vortex can develop in the liquid substance located in the gap 15. As a result, the surface 5 will hardly be attacked, in such a way that the condition thereof will remain suitable for a prolonged period.

For further improvement of the durability of the pipe connection, a flow guide 16 is provided on the inside of the innermost shell part 3. This flow guide extends from the welding sleeve 20 of the ring 9 to which the one pipe section is welded to near the inner surface 14 of the lining 13. Near the inner surface 14, the flow guide 16 changes into a nose 19 which lies close up to the surface 14, forming a gap 22. This gap 22 between the nose 19 and the lining 13 has a dimension which is roughly as great as that of the gap 15 between the lining 13 and the innermost shell part 3. The flow guide promotes a regular flow of the medium fed through the pipe connection, in such a way that as little turbulence as possible occurs therein. In this context, the flow guide preferably has an essentially cylindrical part 17 close to the welding sleeve 21, which changes into a part 18 which widens in the form of a trumpet and ends in the nose 19.

Furthermore, as a result of the widening shape of the innermost surface of the flow guide 16, the free flow area remains largely unobstructed, also in the extreme rotated positions of the innermost shell part 3.

The invention claimed is:

1. A pipe connection, comprising:
   a ball joint (1) having shell parts (3, 4), the shell parts being an outermost shell part (4) and an innermost shell part (3), the innermost shell (3) having an outer surface (7),
   pipe connection means (20, 21) at the ends of the shell parts (3, 4) which face away from each other and which are to be connected to a respective pipe section,
   wherein the shell parts (3, 4) i) surround one another in a contacting manner, each shell part defining a respective longitudinal center line and ii) are rotatable in relation to one another between a) an aligned position, in which the longitudinal center lines coincide, and b) a rotated position, in which the longitudinal center lines form an angle with one another which differs from zero,
   wherein the shell parts (3, 4) together enclose an axial passage which extends between the ends of the shell parts (3, 4),
   a sealing element (6) located between the outermost shell part (4) and the innermost shell part (3), and
   a lining (13) which extends between the outermost shell part (4) and a corresponding one of the pipe connection means (21), wherein the lining (13) has a shape following a path of the innermost shell part (3) while the innermost shell part (3) is being rotated upon adjusting the ball joint, the lining (13) including an inner lining surface (14), and
   a curved flow guide (16) located in the innermost shell part (3), the curved flow guide (16) extending beyond an end of the innermost shell part (3) which adjoins the lining (13), and the curved flow guide (16) having a nose end (19) lying close up to the inner lining surface (14) in extreme rotated positions of the innermost shell part (3).

2. Pipe connection according to claim 1, wherein the outermost shell part (4) comprises shell part halves (11, 23) which enclose the innermost shell part (3) and which each directly contact said innermost shell part.

3. Pipe connection according to claim 2, wherein a yoke (8) is attached to the one of the shell part halves (23) of outermost shell part (4), a gland ring (11) being provided which constitutes the other shell part half of the outermost shell part (4) and which cooperates with said yoke.

4. Pipe connection according to claim 1, wherein the lining surface (14) and the outer surface (5) of the innermost shell part (3) enclose a gap (15) with an essentially uniform thickness.

5. Pipe connection according to claim 1, wherein the lining surface (14) is essentially spherical.

6. Pipe connection according to claim 1, wherein the flow guide (16) has a cylindrically and/or spherically curved inner flow guide surface (17, 18).

7. Pipe connection according to claim 1, wherein the flow guide (16) extends beyond and covers a terminal part of the end of the innermost shell part (3) which adjoins the lining (13).

8. Pipe connection according to claim 7, wherein the nose end (19) is free of any connection to the lining surface (14).

9. Pipe connection according to claim 8, wherein the nose end (19) and the lining surface (14) enclose a gap (22), the size of which is essentially identical to the gap (15) between the lining surface (14) and the outer surface (5) of the innermost shell part (3).

10. Pipe connection according to claim 1, wherein the flow guide (16) comprises a flow guide part (17) which is located close to the pipe connection means (20) of the innermost shell part (3) and which is essentially cylindrical.

11. Pipe connection according to claim 1, wherein the flow guide (16) comprises a flow guide part (18) which is located close to the outermost shell part (4) and which is in the form of a cone or trumpet.

12. Pipe connection according to claim 1, wherein the flow guide (16) comprises a hardened material.

13. Pipe connection according to claim 1, wherein the lining comprises a hardened material (13).

14. Pipe connection according to claim 1, wherein the pipe connection means comprise welding sleeves (20, 21).

15. Pipe connection according to claim 1, wherein the pipe connection means comprise connection flanges.

16. Pipe connection according to claim 1, wherein the contacting surfaces (7; 5, 12) of the innermost shell part (3) and of the outermost shell part (4) are spherical.

17. Pipe connection means according to claim 1, wherein a case (24) is provided which extends between the outer shell part (4) and the corresponding pipe connection means (20), said case being releasably connected to the outer shell part, and the lining (16) being enclosed between facing abutments (25, 26) on the outer shell part (4) and the case (24).

18. Pipe connection according to claim 1, wherein the outermost shell part (4) comprises shell part halves (11, 23) which enclose the innermost shell part (3).

19. A pipe connection, comprising:
- a ball joint (1) comprised of an innermost shell part (3) with a first end, and an outermost shell part (4) with a second end,
- the first and second ends opening opposite each other,
- each of the innermost and outermost shell parts defining a respective longitudinal center line,
- the innermost shell (3) having an outer surface (7),
- the outermost shell part (4) surrounding the innermost shell part (3) in a contacting manner,
- the innermost and outermost shell parts being rotatable in relation to one another between
  a) an aligned position, in which the respective longitudinal center lines coincide, and
  b) a rotated position, in which the respective longitudinal center lines form an angle with one another which differs from zero,
- the shell parts (3, 4) together enclosing an axial passage which extends between the first and second ends of the innermost and outermost shell parts (3, 4);
- a first pipe connection (20) at the first end of the innermost shell part (3);
- a second pipe connection (21) at the second end of the outermost shell part (4);
- a sealing element (6) located between the outermost shell part (4) and the innermost shell part (3);
- a lining (13) which extends along an inner surface of the outermost shell part (4) to an inner surface of the second pipe connection (21),
- the lining (13) having an interior side with a shape corresponding to a shape of the outer surface (7) of the innermost shell part (3), the interior side of the lining (13) following a path of the innermost shell part (3) when the innermost shell part (3) is being rotated upon adjusting the ball joint, the lining (13) including an inner lining surface (14); and
- a curved flow guide (16) located inside of the innermost shell part (3) and extending from the first pipe connection (20) beyond an end of the innermost shell part (3) located adjacent the lining (13), the curved flow guide (16) having a nose end (19) that extends beyond and covers a terminal part of the end of innermost shell part (3), the nose end (19) lying close up to the inner lining surface (14) in extreme rotated positions of the innermost shell part (3).

* * * * *